United States Patent
Watters

(10) Patent No.: US 8,397,439 B2
(45) Date of Patent: Mar. 19, 2013

(54) PANEL

(75) Inventor: Philip Graham Watters, Falkirk (GB)

(73) Assignee: Safehouse Habitats (Scotland) Limited (GB)

( * ) Notice: Subject to any disclaimer, the term of this patent is extended or adjusted under 35 U.S.C. 154(b) by 295 days.

(21) Appl. No.: 12/305,866

(22) PCT Filed: Jun. 20, 2007

(86) PCT No.: PCT/GB2007/002284
§ 371 (c)(1),
(2), (4) Date: Feb. 11, 2009

(87) PCT Pub. No.: WO2007/148075
PCT Pub. Date: Dec. 27, 2007

(65) Prior Publication Data
US 2009/0199973 A1  Aug. 13, 2009

(30) Foreign Application Priority Data
Jun. 21, 2006  (GB) .................................. 0612266.7

(51) Int. Cl.
*E04B 1/12* (2006.01)
(52) U.S. Cl. ................ 52/63; 52/2.17; 52/222; 52/273; 52/784.11; 52/787.11
(58) Field of Classification Search ............ 52/2.11, 52/2.17, 63, 222, 273, 783.1, 784.11, 787.11, 52/796.1, DIG. 6, 510, 778, 779, DIG. 13
See application file for complete search history.

(56) References Cited

U.S. PATENT DOCUMENTS

| 227,934 | A | * | 5/1880 | Walton ........................ 52/784.11 |
| 3,307,306 | A | | 3/1967 | Oliver |
| 3,318,063 | A | | 5/1967 | Stone et al. |
| 3,452,764 | A | | 7/1969 | Bell |
| 3,715,843 | A | | 2/1973 | Ballinger |
| 3,991,583 | A | * | 11/1976 | Scurlock ........................ 405/193 |
| 4,433,700 | A | * | 2/1984 | Dohet ............................ 135/97 |
| 4,467,005 | A | | 8/1984 | Pusch et al. |
| 4,500,592 | A | | 2/1985 | Lee et al. |
| 4,583,331 | A | * | 4/1986 | Hunt et al. ..................... 52/2.17 |
| 5,018,321 | A | | 5/1991 | Wardlaw, III |
| 5,032,447 | A | | 7/1991 | Bailey |

(Continued)

FOREIGN PATENT DOCUMENTS

| DE | 4304079 | 5/1994 |
| DE | 29515205 | 11/1995 |

(Continued)

OTHER PUBLICATIONS

International Search Report mailed Oct. 4, 2007, International Application No. PCT/GB2007/002284.
Australian Examination Report for Application No. 2007262773 dated Dec. 18, 2012.

*Primary Examiner* — Brian Glessner
*Assistant Examiner* — James Buckle, Jr.
(74) *Attorney, Agent, or Firm* — Patterson & Sheridan, L.L.P.

(57) ABSTRACT

The present invention relates to a panel (20) for use in the assembly of a modular hot work habitat (10) so as to form an enclosure to facilitate hot working. The panels (20) comprise a first layer of flexible structural material (22), and a second layer of flexible fireproof material (24) fixed to the structural layer. A habitat (10) comprising a plurality of interconnected panels (20) is described.

11 Claims, 2 Drawing Sheets

U.S. PATENT DOCUMENTS

| | | | |
|---|---|---|---|
| 5,660,916 A | 8/1997 | Sofie et al. | |
| 5,685,771 A * | 11/1997 | Kleppen | 454/56 |
| 6,013,586 A | 1/2000 | McGhee et al. | |
| 7,091,848 B2 * | 8/2006 | Albarado | 340/506 |
| 7,189,349 B2 * | 3/2007 | Karle | 422/28 |
| 7,897,235 B1 * | 3/2011 | Locher et al. | 428/76 |
| 2002/0053176 A1 * | 5/2002 | Colson et al. | 52/506.06 |
| 2004/0074155 A1 * | 4/2004 | Toledo | 52/36.1 |
| 2005/0136760 A1 | 6/2005 | Anderson et al. | |
| 2006/0260271 A1 * | 11/2006 | Swiszcz et al. | 52/783.1 |

FOREIGN PATENT DOCUMENTS

| | | |
|---|---|---|
| EP | 0609600 | 8/1994 |
| EP | 1541338 | 6/2005 |
| WO | 0120088 | 3/2001 |
| WO | WO 02/18692 | 3/2002 |
| WO | 2005118973 | 12/2005 |

\* cited by examiner

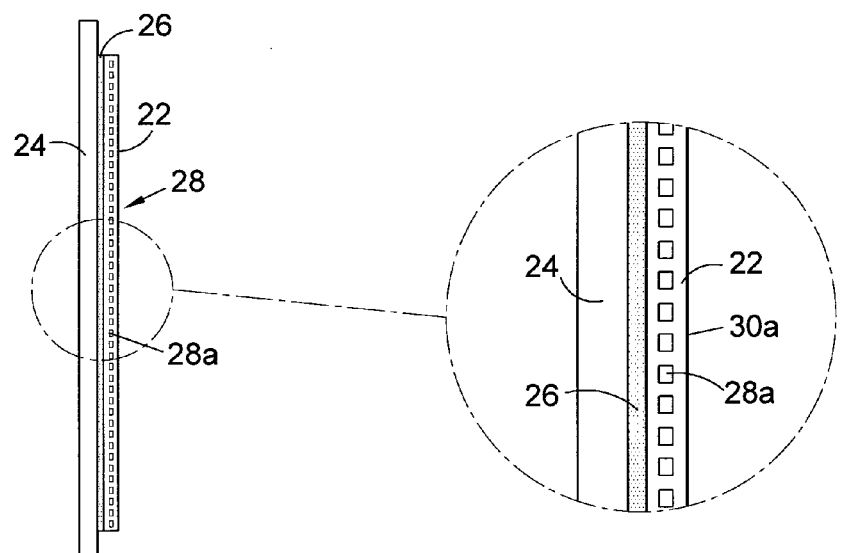
Fig. 3
Fig. 4
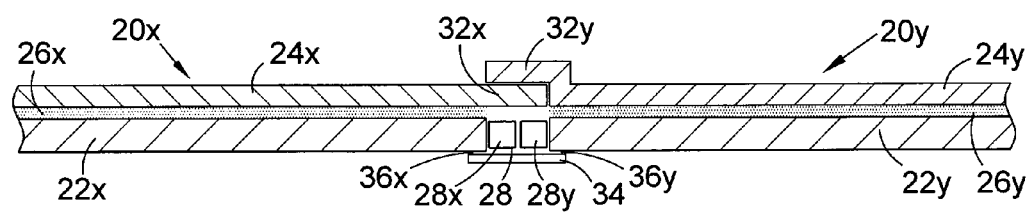
Fig. 5

PANEL

FIELD OF THE INVENTION

The present invention relates to an improved panel, particularly to an improved panel for use in the construction of habitats for surrounding an area in which hot work is to take place. The invention also relates to a habitat constructed from the improved panels. The invention also relates to an improved habitat structure and to a refuge for use in hazardous working environments.

BACKGROUND OF THE INVENTION

Conducting "hot work" such as welding, cutting or grinding generates heat and sparks. In certain environments hot working can be extremely hazardous, particularly where there may be combustible gases, particularly hydrocarbons, present, for example on oil/gas search and production rigs and facilities, oil refineries, chemical plants and the like.

Hot work habitats (or enclosures) permit hot work to be conducted in such environments. A hot work habitat is an enclosure which can be built around the area in which hot work is to be performed. Examples of habitats or enclosures are disclosed variously in U.S. Pat. Nos. 5,018,321, 5,101,604, 3,452,764. Once built, some habitats can be over pressurised, that is the air pressure within the habitat can be raised above the air pressure external to the habitat to prevent the ingress of potentially flammable gases into the habitat.

Conventionally, habitats are made from galvanised sheeting and wooden panelling which can be lined around the floor area with fire resistant matting. However these habitats are inflexible and cumbersome, and flexible, generally one piece, dome structures such as U.S. Pat. Nos. 5,018,321 and 5,101,604 were developed. Since then modular systems comprising flexible flame retardant fabric panels have been developed. Modular habitats have drawbacks however; firstly, in the event of a fire breaking out within the habitat, a modular habitat is not designed to contain the fire; the flame retardant fabric panels only being capable of withstanding temperatures of up to approximately 70° C. Secondly, if the fabric is breached or torn, an equalisation of pressure can result with the possible consequence of an ingress of potentially combustible gases. Such a breach can occur, for example, by performing hot work close to the flame retardant fabric such that a continual shower of sparks from grinding operations or a naked flame burns a hole in the material. The dome structures referred to above are also cumbersome to install and to fireproof adequately. A single breach in the dome renders the whole habitat unusable. Furthermore fire blankets are generally difficult to secure and install in a vertical orientation.

Whilst it would be desirable to use fireproof material instead of flame retardant fabric for the panels fireproof material is generally not suitable for stitching i.e. they cannot readily be stitched together to form panel structures or have zips or other fasteners attached thereto to allow panels to be connected together. Whilst it is possible to stitch fireproof materials specialist threads are required to maintain the fireproof integrity of the fireproof panel. It will be appreciated that any connecting means must have at least the same fireproof characteristics as the panels or the integrity thereof would be diminished in the event of a fire. One type of thread that can be used to stitch fireproof panels is a quartz based thread but such threads are generally extremely brittle and thus do not lend themselves to use in the stitching of fireproof panels for use in habitats as the constant handling of the panels would result in the thread breaking.

It is an object of at least one embodiment of the present invention to provide an improved panel for a hot working habitat.

SUMMARY OF THE INVENTION

According to a first aspect of the present invention there is provided a panel for use in the assembly of a modular hot work habitat, the panel comprising:
a layer of flexible structural material, and
a layer of flexible fireproof material fixed to the layer of structural material.

Utilising two layers of flexible material to form a composite panel provides structural integrity, reducing the possibility of the panel, in use, being torn. Additionally, providing a fireproof layer prevents breach of the habitat by sparks or other hot material, and increases the chances of a fire within the habitat being contained.

Preferably, the layers are arranged to lie in parallel planes, in a laminated structure. Preferably, the laminated panel is flexible.

Preferably, the layer of structural material is a flame retardant material.

Preferably, the flame retardant material is a flame retardant fabric.

Most preferably, the flame retardant fabric is PVC coated woven polyester fabric coated with plasticized polyvinylchloride in the range of 10-40%; polyethyleneterephtalate in the range of 20-80%; and di-isononylphtalate in the range of 0-30%, thereby providing temperature resistance in the range of −30° C. to +70° C.

Preferably, the fireproof material layer is a fireproof fabric.

Most preferably, the fireproof fabric is silica chemically treated to create an amorphous silica coating on each side with a high temperature resisting silicone rubber.

Preferably the fireproof comprises a base fabric having a weight in the region of 400 gm$^2$-700 gm$^2$. The weight of the coated fabric is in the range of from 800 gm$^2$-1200 gm$^2$, typically 1075 gm$^2$ and has a thickness in the range of from 0.5 mm to 1 mm, typically 0.65 mm.

Preferably, the layers are fixed by being adhered to each other by a silicone adhesive. Silicone adhesives are particularly useful as silicone adhesives have a temperature rating that is generally not less than the temperature rating of the fireproof fabric and tend not to burn, therefore assisting in maintaining the integrity of the panel in the event of fire. Other types of flame retardant adhesives may be used such as SPRAYTACK™ adhesive by 3M or flame retardant tapes.

Alternatively, or indeed preferably, there may be provided mechanical fixing means to fix two panels to each other in addition to adhering by an adhesive. Typical mechanical fixings may include rivets, nuts, bolts and the like and mechanical fixings are particularly suitable if the panel is used in a vertical orientation.

Preferably, the fireproof material contains silicone.

Preferably, the panel is arranged such that, in use, the fireproof layer forms part of an internal surface of a habitat. In the event of a fire within the habitat, damage to the habitat is minimised if the fireproof layer forms part of an internal surface of the habitat, if the habitat remains structurally intact the possibility of containing the fire within the habitat is increased.

Preferably, the panel includes attaching means to permit the panel, in use, to be attached to an adjacent panel or panels.

Preferably, the attaching means are fitted to the structural material layer.

Preferably, the structural material layer includes an edge and the attaching means are fitted to the edge of the structural material layer.

Preferably, the attaching means extend around the entire perimeter of the structural material layer.

Preferably, the attaching means is at least one zip portion adapted to engage with a complementary zip portion fitted to a second panel. Other attaching means which could be used include hooks and eyelets, press studs, turn buttons, lift-a-dot, and nuts and bolts.

Preferably, the fireproof material layer has a greater surface area than the structural material layer.

Most preferably, a portion of the fireproof material layer extends beyond the edge of the structural material layer.

Preferably, the portion extends beyond the edge of the structural material layer around the entire perimeter of the structural material layer.

Preferably, the fireproof material layer portion extends sufficiently to protect, in use the attaching means. Providing a portion of fireproof material to cover the attaching means protects the attaching means from a fire, assisting in maintaining the integrity of an assembled habitat.

Preferably, in use when the panel is attached to an adjacent panel, adjacent fireproof material layer portions overlap.

Preferably, the flame retardant layer of the panel further includes an extended portion formed and arranged to cover the attaching means.

Preferably, the at least extended portion in the form of a protection strip which is releasably attachable to the structural material layer.

Preferably, the extended portion is releasably attachable to the structural material layer by means of a hook and loop fastener or other mechanical fixings as described above.

Preferably, the/each extended portion is flame retardant.

Preferably, the/each extended portion is adapted to cover the attaching means.

Preferably, the/each extended portion is adapted, in use, to attach to adjacent connected panels. In use, the attaching means, for example a zip, is enclosed on one side by the overlapping first and second fireproof material layer portions and on the other side by the extended portion. Such an arrangement assists in sealing an assembled habitat facilitating over-pressurising of the habitat.

Preferably, the fireproof material layer is adapted to withstand temperatures to in excess of 1200° C., typically 1000° C. though materials that are fireproof to higher temperatures e.g. 1600° C., may be employed.

According to a second aspect of the present invention there is provided a modular hot work habitat comprising:
 a plurality of connected panels, each panel comprising:
 a layer of flexible structural material, and
 a layer of flexible fireproof material fixed to the layer of structural material.

Preferably, the panels are arranged such that the fireproof material layers face inwards towards the interior of the habitat.

According to a third aspect of the present invention there is provided a kit for assembling into a modular hot work habitat, the kit comprising:
 a plurality of panels, each panel comprising:
 a layer of flexible structural material, and
 a layer of flexible fireproof material fixed to
 the layer of structural material.

In yet another respect the present invention provides a refuge suitable for use in environments where there is the possibility of fire comprising an inner tent like structural assembly, said structural assembly comprising flexible panels formed and arranged for supporting, on its outside, fireproof material fixed thereto.

It will be understood some of the features depending from the first aspect of the invention may be equally applicable to the second and subsequent aspects, and are not repeated here for brevity and clarity.

Preferably the habitat according to any aspect of the present invention includes an airlock, preferably a fireproof airlock, formed and arranged so as to be securable to said panels. Additionally there may be provided a support structure such as scaffolding for supporting a said habitat according to the invention.

BRIEF DESCRIPTION OF THE DRAWINGS

An embodiment of the present invention will now be described with reference to the accompanying drawings in which:

FIG. 3 is a side view of the panel of FIG. 2;

FIG. 4 is an enlarged view of part of FIG. 3; and

FIG. 5 is a section view of part of a wall of the habitat of FIG. 1, taken along line A-A shown on FIG. 1.

DETAILED DESCRIPTION OF THE DRAWINGS

Figure 1:
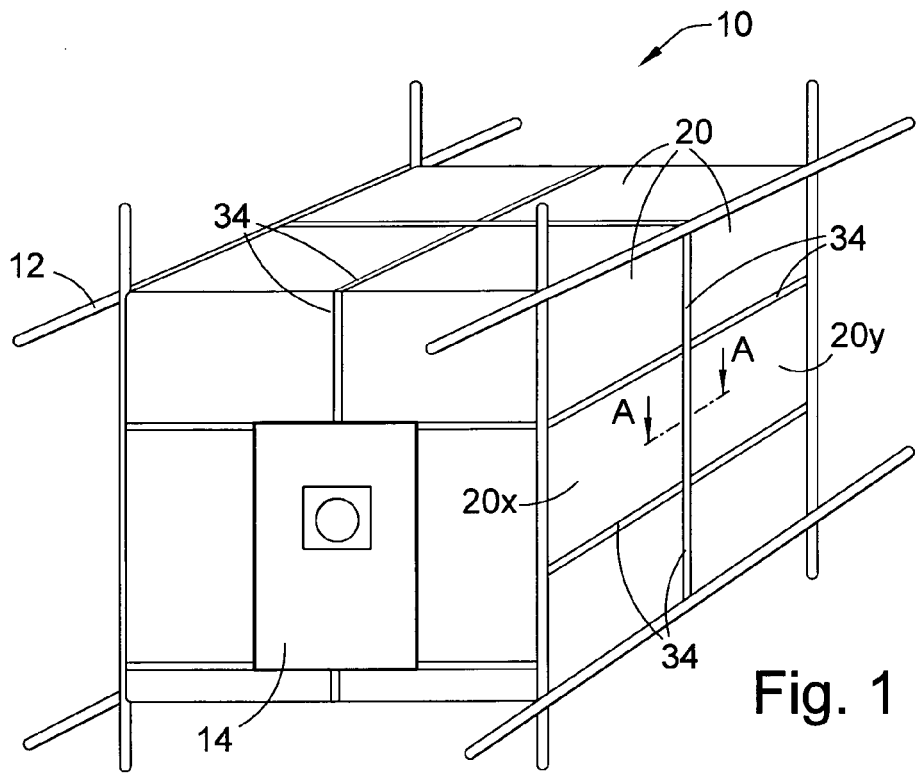
FIG. 1 is a schematic perspective view of a hot work habitat comprising a plurality of connected panels according to an embodiment of the present invention.

Referring firstly to FIG. 1, there is shown a habitat, generally indicated by reference numeral 10, comprising a plurality of connected panels 20 according to an embodiment of the present invention. The habitat 10 is designed to be assembled around an area in which hot work is to take place.

The connected panels 20 are supported by a structural frame 12 and the habitat 10 also includes an access door 14 for accessing the habitat interior.

Figure 2:
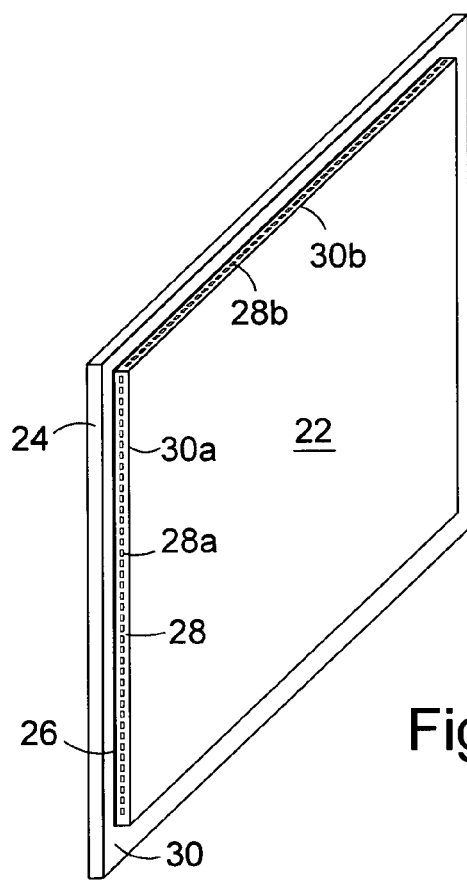
FIG. 2 is a schematic perspective one of the panels shown on FIG. 1.

One of the panels 20 can be seen more clearly in FIGS. 2, 3 and 4; perspective, side and enlarged side views of a panel 20. The panel 20 comprises a flame retardant structural layer (22) made from Sio-Line FR725 material available from Sioen Coating Distribution n.v. of Belgium, and a fireproof layer made from Fortasil SKSS 600R distributed in the UK by TBA Textiles Ltd. The fireproof layer 24 is secured to the structural layer 22 by a silicone adhesive 26 such as AS1606 by ACC Silicones Ltd. The panel 20 is approximately 2 m by 2 m.

In use with the habitat 10, the fireproof layer 24 faces inwardly towards the habitat interior to assist in containing any fire which may break out within the habitat 10 during hot working. The flame retardant structural layer 22 faces outwards from the habitat 10 to protect the habitat 10 from heat generated externally of the habitat 10. The composite arrangement of the panel 20 makes the panel 20 better able to withstand activities which might otherwise breach the panel 20, such as being exposed to a sharp edge or a concentrated shower of sparks.

The flame retardant structural layer 22 includes attaching means 28 along its edges 30. The attaching means 28 in the case of the panel 20 is a series of zip fasteners 28; one half of a first zip fastener 28a is fitted along a first edge 30a, one half of a second zip fastener 28b is fitted along a second edge 30b, etc. Each half zip fastener 28a, 28b is adapted to engage with a complementary half zip fastener (not shown) on an adjacent panel.

As can be seen most clearly from FIG. 2, the fireproof layer 24 includes a portion 32 which extends beyond the flame retardant structural layer edge 30. The purpose of this extending portion 32 is to protect the zip fasteners 28, as will now be explained with reference to FIG. 5.

FIG. 5 is a section view of part of a wall of the habitat of FIG. 1, taken along line A-A shown on FIG. 1. FIG. 5 shows parts of two panels 20x, 20y which are connected by a zip fastener 28 comprising zip halves 28x, 28y, each half zip 28x, 28y fitted to a respective structural layer 22x, 22y of the panels 20x, 20y. The extending portions 32x, 32y of the fireproof layers 24x, 24y overlap and cover the zip fastener 28. As explained above, the fireproof layers 24x, 24y face inwardly towards the habitat interior. The overlapping extending portions 32x, 32y cover the zip fastener 28 protecting the zip fastener 28 in the event of a fire breaking out within the habitat 10.

Also visible in FIG. 5 (and FIG. 1), is a protective strip 34. The protective strip 34 is made of flame retardant material and protects the external surface of the zip fastener 28 from heat arising externally of the habitat 10. The protective strip 34 is attached to the panels 20x, 20y by hook and loop fastenings 36x, 36y.

The presence of the overlapping portions 32 and the protective strip 34 also assist in providing a seal around the edges of each panel 20. The panels themselves are impermeable to hydrocarbon gases. Once assembled the habitat 10 can be over-pressurised, that is the air pressure within the habitat 10 can be raised above the air pressure externally of the habitat 10. Such an arrangement prevents combustible gases which may be circulating externally of the habitat 10 from entering the habitat and potentially being ignited.

Various modifications may be made to the embodiments of the improved panel described above without departing from the scope of the invention. For example, although the panel 20 is described as having a single structural layer and a single fireproof layer, there could be multiple layers of each material. Furthermore, although the described embodiment is arranged with the fireproof layer 24 facing inwards towards the interior of the habitat 10, in certain circumstances it may be desirable for the fireproof layer 24 to face outwards.

It will be appreciated that the principal advantage of the above described embodiments is that a habitat can be assembled which is highly resistant to fire and is structurally stronger than inflatable habitats.

The invention claimed is:

1. A panel for use in the assembly of a modular hot work habitat, comprising:
   a layer of flexible structural material, and
   a layer of flexible fireproof material fixed to the layer of structural material, wherein:
      the panel is formed and arranged, in use, to be attached to an adjacent panel or panels by attaching means, and
      the fireproof material layer has a greater surface area than the structural material layer such that a portion of the fireproof material layer extends sufficiently beyond the edge and around the perimeter of the structural material layer to protect the attaching means, in use; and
      when attached to an adjacent panel, the attaching means is constructed and arranged to permit pressurized air on a first side of the attachment means to communicate with non-pressurized air on a second side.

2. A panel as claimed in claim 1 wherein the layers are arranged to lie in parallel planes, in a laminated structure.

3. A panel as claimed in claim 1 wherein the layer of structural material is a flame retardant material.

4. A panel as claimed in claim 3 wherein the flame retardant material is a flame retardant fabric.

5. A panel as claimed in claim 1 wherein the fireproof material layer is a fireproof fabric.

6. A panel as claimed in claim 1 which is flexible.

7. A panel as claimed in claim 1 wherein the layers are fixed by being adhered to each other by a silicone adhesive.

8. A panel according to claim 1 wherein the attaching means are fitted to the structural material layer.

9. A panel according to claim 1 wherein the attaching means is at least one zip portion adapted to engage with a complementary zip portion fitted to a second panel.

10. A panel as claimed in claim 1 wherein:
    the layer of structural material is a flame retardant material, and
    the flame retardant structural material layer of the panel includes a protective strip formed and arranged to cover the attaching means.

11. A modular hot work enclosure comprising:
    a plurality of interconnected panels forming the enclosure, the enclosure wholly defining an over pressurized area in which hot work may be undertaken;
    a door for accessing the over pressurized area;
    a supply of over pressurized air;
    wherein each panel is attached to an adjacent panel or panels and each panel comprises a layer of flexible structural material,
    an inner layer of flexible fireproof material is fixed to the layer of structural material whereby the fireproof material layer has a greater surface area than the structural material layer resulting in a perimeter of fireproof material layer that extends beyond the edge of each panel; and
    connection means between the panels, the connection means constructed and arranged to permit leakage from the pressurized area to a non-pressurized area external of the enclosure.

* * * * *